UNITED STATES PATENT OFFICE.

ANTONIO BUZOLICH, OF NORTH CARLTON, AND T. KING SMITH, OF PRAHRAN, VICTORIA.

PAINT.

SPECIFICATION forming part of Letters Patent No. 291,677, dated January 8, 1884.

Application filed September 18, 1882. (No specimens.) Patented in Victoria May 11, 1882, No. 3,220; in South Australia August 24, 1882, No. 271; in Tasmania August 30, 1882, No. 246; in India September 6, 1882; in England September 16, 1882, No. 4,423; in France September 19, 1882; in New South Wales September 25, 1882; in Italy September 30, 1882; in Queensland October 5, 1882; in Canada October 16, 1882, No. 15,634; in Belgium October 16, 1882; in Sweden November 25, 1882; in New Zealand December 27, 1882, No. 754; in Western Australia February 2, 1883, and in Spain March 15, 1883.

*To all whom it may concern:*

Be it known that we, ANTONIO BUZOLICH and THOMAS KING SMITH, subjects of the Queen of Great Britain, residing, respectively, at Nicholson street, North Carlton, in the British colony of Victoria, decorator, and at Hoddle street, Prahran, in the said colony, manufacturing chemist, have invented an improved composition to be used as a paint, either with or without the ordinary pigments, of which the following is a specification.

Our improved composition, which is to be used as a paint either with or without the ordinary pigments, has many valuable properties. It is not only easy of application, pleasant to the eye and touch, and susceptible of receiving and retaining any tint or color given to it, but it also produces a surface which is almost, if not absolutely, impervious to atmospheric influences, to the action of sea as well as fresh water, and is an excellent insulating material, in addition to which it can be produced at a reasonably cheap rate.

The process of manufacturing our composition is, first, to heat the oil, which forms the basis of the composition; second, to destroy all animal life in it by poisonous acid; third, to refine it by chemical admixture and mechanical filtration; fourth, to supply a material which will neutralize the action of the alkali and acids used in the manufacture; fifth, to strengthen its body and prevent its coagulation; sixth, to increase its adhesiveness.

In practice we proceed as follows: We first provide a common iron boiler of the size suited to the extent of the operations to be carried on, and in order to simplify the description we will suppose that only one gallon of oil is to be heated, as the proportions of the various ingredients will ever remain the same, no matter what quantity is used. This one gallon of ordinary seed or nut oil we place in the iron boiler and heat it with a steam-coil until it reaches a temperature about 15° below boiling-point, when (second) we add one and a quarter ounce of hydrochloric acid and stir it well together until it reaches about 5° below boiling-point. We then (third) refine it by adding three-quarters of an ounce of phosphoric acid and immediately afterward conducting it to a filter, which we prefer to construct in the following manner, but which of course may be constructed in any manner, so long as it acts effectively. We take a wooden cask or vat and divide it into an upper and lower compartment by fixing across the center of the cask or vat an open perforated tray or grating, on which we first lay one piece (cut to size) of coarse filtering-cloth, either flannel or flax bagging, then a complete layer each, of about one inch in thickness, of (in the following order) animal charcoal, fresh-slaked lime, coarse fresh-water sand, wood shavings, pulverized wood-charcoal, sawdust, and asbestus, evenly laid, leveled, and well compressed. On the top of this filter-bed we lay a mat, made of horse-hair of medium coarse texture or mesh, (to act as a sieve,) onto which the hot oil is poured and allowed to trickle through the filter-bed to the lower half of the cask or vat, where it remains until it is cold. After this we put one gallon of the oil thus refined into the same or a similar boiler to that already described, heat it to about 25° below boiling, when we add small portions of the following mixture at intervals of a few seconds, viz: two ounces of shellac dissolved and mixed with one ounce of common resin or powdered rock benzoin, so as to form a paste. After adding this mixture, and when it reaches to within 7° to 8° below boiling-point, we add, first, three ounces of crushed beeswax and afterward sixteen ounces of crushed garlic. Immediately after the garlic is added we cut off the steam from the coil and open a tap to allow the contents of the boiler to discharge into a receptacle below, where it remains to cool. When cold, we pass it through a common sieve, and it is ready for use.

Our improved composition thus produced may be used either with or without a pigment, as the circumstances of the case may require. Thus, if it is required to remain as a coating— like paint, say, for instance—on ships' bottoms, it must have a pigment; but if it is required to permeate a material, so as to harden or dry it and destroy insect life therein—as, for instance, when applied to piles or damp walls—it should be used without a pigment.

When our composition is simply required for hardening and preserving or as a waterproofing material, we omit items four and six—that is, those ingredients which are specially used for their poisonous properties.

Having thus stated the various ingredients of which our composition is made, together with their proportions and the time and manner of using them, which we have found to produce the best results, we desire to state that these proportions may be varied, as well as the degrees of heat at which the various ingredients are to be applied; but under no circumstances must the liquor be allowed to boil, overflow, char, or burn during the process of manufacture.

Having thus described the nature of our said invention and in what manner the same is to be performed, we declare that we claim—

The composition herein described for a varnish or vehicle for paint, consisting, substantially, of the following elements, viz: linseed or nut oil, hydrochloric acid, phosphoric acid, shellac, resin, chromate of potash, beeswax, and garlic, substantially in the proportions set forth.

ANTONIO BUZOLICH.
T. KING SMITH.

Witnesses:
EDWD. WATERS,
W. S. BAYSTON.